April 16, 1968   W. T. ROSS ET AL   3,378,458
NUCLEAR REACTOR FUEL ELEMENT
Filed Oct. 19, 1965   4 Sheets-Sheet 1

INVENTORS:
Dominic A. Venier
Wilfred T. Ross
BY

April 16, 1968     W. T. ROSS ET AL     3,378,458
NUCLEAR REACTOR FUEL ELEMENT

Filed Oct. 19, 1965     4 Sheets-Sheet 2

INVENTORS:
Dominic A. Venier
Wilfred T. Ross
BY

April 16, 1968  W. T. ROSS ET AL  3,378,458
NUCLEAR REACTOR FUEL ELEMENT
Filed Oct. 19, 1965  4 Sheets-Sheet 3

INVENTORS:
Dominic A. Venier
Wilfred T. Ross
BY
Charles J. G. Curry

INVENTORS:
Dominic A. Venier
Wilfred T. Ross
BY

United States Patent Office 3,378,458
Patented Apr. 16, 1968

3,378,458
NUCLEAR REACTOR FUEL ELEMENT
Wilfred T. Ross and Dominic A. Venier, San Jose, Calif., assignors to General Electric Company, a corporation of New York
Filed Oct. 19, 1965, Ser. No. 497,788
11 Claims. (Cl. 176—79)

The present invention relates broadly to an improvement in nuclear fission reactors and more particularly to fuel elements which are employed in such nuclear fission reactors.

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear disintegration. This produces on the average two fission products of lower atomic weight and great kinetic energy, and several fission neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes or rods. These fuel elements are usually provided on their external surfaces with a corrosion-resistant, non-reactive cladding which contains no fissionable or fertile material. The fuel elements are grouped together at fixed distances from each other in a coolant flow channel or region as a fuel assembly, and sufficient fuel assemblies are combined to form the nuclear reactor core capable of the self-sustained fission reaction referred to above. The core is enclosed within a reactor vessel.

The fuel element with which the present invention primarily is concerned includes a plenum chamber which is provided to collect fission product gases which are given off by the nuclear fuel during operation of the nuclear reaction. In addition, it includes a plenum spring that is disposed within the plenum chamber to apply a force against the end plug of the fuel element and the fuel disposed within the fuel element tube to prevent the fuel from sliding in shipment.

One of the problems involved in the operation of nuclear reactors pertains to the structural failure of these fuel elements. This may be caused by failure of a welded or fused joint which has not been properly formed. In the manufacture of fuel elements, it is generally necessary to employ considerable heat to join the end plugs to the fuel element tube or clad. A significant manufacturing problem was encountered when the heat from the welding process exceeded the eutectic temperature of the materials from which the end plug and plenum spring were made which then melted and mixed with the molten weld material. When the molten eutectic alloy mixed with the molten weld material the weld became brittle and also subject to corrosion. When subjected to the reactor environment, this led to the formation of cracks or openings in the weld region which directly exposed the fuel and fission product gases contained within the fuel element to the coolant of the reactor. Upon the occurrence of this condition, not only must the fuel element be replaced, but the coolant may carry radioactive material and may contaminate various parts of the reactor and coolant circuit.

Considerable difficulty has been encountered in developing a fuel element design wherein the plenum spring and end plug were not heated above their eutectic temperature and, even if they were, there was no resulting contamination of the weld. Various shapes of end plugs and tube thicknesses have been used in attempting to overcome this problem, however, without substantial success. The present invention has successfully overcome this problem.

Briefly, the present invention provides a plenum spring that is shaped such that it is in contact only with the coolest portion of the end plug. This substantially reduces the probability of melting the plenum spring during welding. In addition, the shape is such that even if the eutectic temperature of the plenum spring and end plug is exceeded, the resultant molten material is sufficiently removed from the weld region the weld contamination is virtually eliminated. In the preferred embodiment, these two results are achieved by bending the end loop of the plenum spring at a 90° angle which causes the top of the loop to contact only the center of the end plug. This is both the coolest region and furthest removed from the weld area. In addition, the end loop is coated with chromium or similar material such that the chromium coated spring and the end plug together have a eutectic temperature that is higher than the eutectic temperature of the uncoated spring and end plug. By coating the end loop, the eutectic temperature is increased such that that the end loop is self-centering while being inserted the loop is even less likely to melt during the welding operation. Another feature of the present invention is into the plenum chamber of the fuel element. Therefore, the end loop will always be at or near the center of the end plug. This is important since the plenum spring is often bent while handled during manufacturing operations.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

Figure 1:
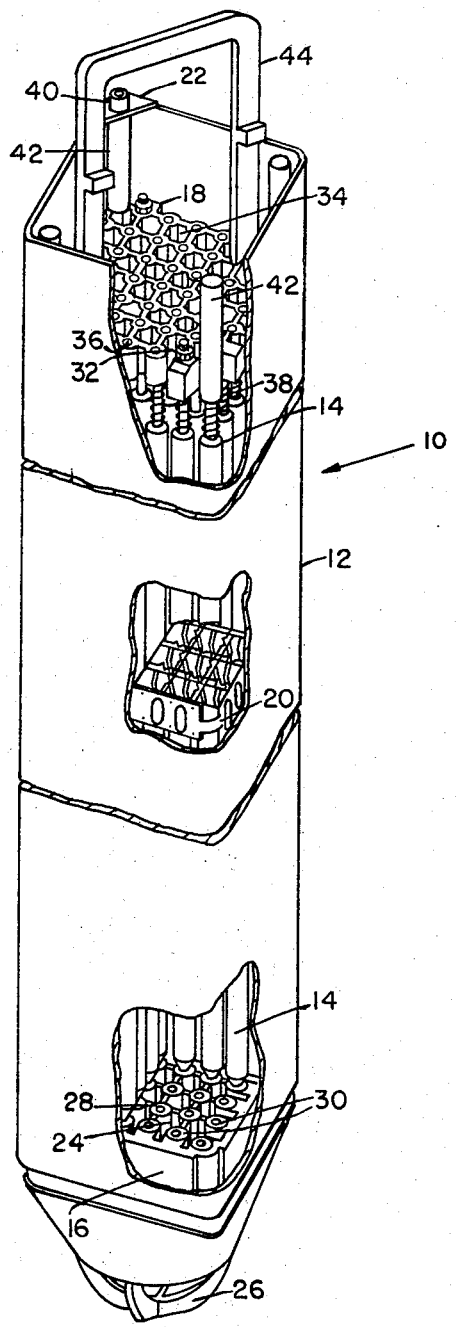
FIGURE 1 is an isometric view, partly in section, of a fuel assembly which incorporates the fuel element of the present invention.

In FIGURE 1 is illustrated a typical fuel assembly which incorporates the fuel elements made in accordance with the present invention. Fuel assembly 10 generally consists of open ended tubular channel 12, fuel elements 14, lower tie plate 16, upper tie plate 18 and fuel element spacer devices 20. Tubular channel 12 has a square cross-section with the upper end having corner members 22 which support the channel after it has been inserted over the fuel elements. Fuel elements 14 are inserted into and are suported in spaced relation by a plurality of fuel element spacer devices 20 which rest against the interior surface of tubular channel 12. These fuel element spacer devices are separated from one another a predetermined distance along the bundle, for example, one and one-half feet, and are connected to one or more of the fuel elements to prevent longitudinal movement of the spacer devices.

This connection may be achieved by various means such as the attachment of locking devices to the fuel element at these same predetermined distances. Each such locking device may comprise a square collar welded to the outer surface of the fuel element. The square collar has a concentric opening with a diameter slightly larger than that of the fuel element so that it may be inserted thereover and welded in place. In addition, the outside dimensions of the square collars are slightly less than the dimensions of the cells of the spacer device. An annular groove extending around the periphery of the square collar is provided for receiving the retainer wires of the spacer device. After the fuel element has been inserted into the aligned cells of the spaced apart spacers and the grooves of the collars are aligned with the appropriate retainer wires, the fuel element is rotated about 45° such that the grooves capture the retainer wires of the spacers. It is also important to note that the locking device should not create vapor pockets which may cause undesirable hot spots in the fuel element, and it should offer the least possible resistance to the flow of coolant in the channel. This locking device is not shown in the drawings since it does not form a part of the present invention.

Each fuel element 14 comprises an elongated tube containing a fissionable fuel material such as uranium. The fuel material is typically in the form of pellets placed end to end in the tube; however, it may be in the form of a powder or particles. Each end of the tube is sealed to prevent the coolant from contacting the fuel and to prevent fission product gas from escaping the fuel element.

The lower ends of the fuel elements are supported by lower tie plate 16 and register with support cavities 28 which are formed through the tie plate. Openings 24 are positioned adjacent cavities 28 and communicate directly with lower opening 26. The upper end of the tie plate has a square cross-section for receiving the lower end of tabular channel 12. The lower end of the tie plate is tapered and is supported by the internal structure of the reactor. When the fuel assembly is mounted in the reactor, lower opening 26 communicates with a supply plenum containing a source of coolant such as water. Several support cavities, such as the corner cavities denoted by reference numeral 30, are threaded and receive fuel elements having threaded ends.

Upper tie plate 18 is secured to these same threaded fuel elements by nuts, such as that denoted by reference numeral 32, registering with threaded upper extensions thereof. Openings 34 are provided in upper tie plate 18 to communicate the interior of the fuel assembly with the discharge plenum of the reactor. Fuel element support cavities 36 are formed through the upper tie plate. These cavities receive the upper ends of the fuel elements and have sufficient depth to permit their longitudinal expansion. Compression springs 38 are provided to maintain a load, which is determined by the torque applied to nuts 32, between upper tie plate 18 and the upper shoulder of fuel elements 14. Tabular channel 12 is held in place by bolts 40, which are inserted through openings provided in corner members 22, which register with threaded extensions 42 of upper tie plate 18. Upper tie plate 18 is also provided with a handle 44 which is used to raise and lower fuel assembly 10 in the reactor core.

While the above-described fuel assembly may be used in various types of nuclear reactors, it is particularly suited for use with boiling water moderator-coolant type nucuear reactors. During operation of a typical boiling water reactor in which the fuel assembly may be employed, the coolant contained in the supply plenum of the reactor flows through lower opening 26, through openings 24 and upward within channel 12 where it surrounds and flows longitudinally along the exterior surface of fuel elements 14. As the coolant flow upwards it removes heat from the fuel elements and therefore increases in temperature and finally converts to wet steam, having a quality of 10%, for example. This wet steam then flows through openings 34 in upper tie plate 18 which discharges into a discharge plenum within the reactor. The discharge plenum receives the steam from a plurality of fuel assemblies which make up the reactor core. Wet steam from the discharge plenum is then dried and transmitted to a steam consuming device such as a turbine. The condensed steam from the steam consuming device may then be returned to the above-mentioned supply plenum.

Figure 2:
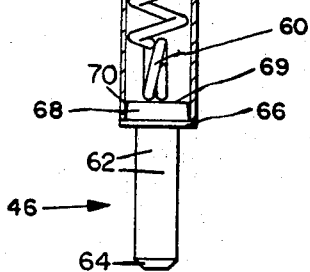
FIGURE 2 is a side elevation view, partly in section, of the fuel element of the present invention.
Figure 5:
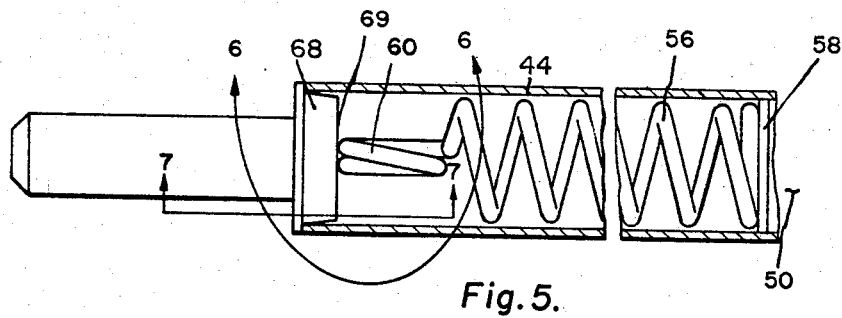
FIGURE 5 is an enlarged sectional view of the upper end of the fuel element of FIGURE 2 wherein the plenum spring, in association with the tube and end plug, is constructed and arranged in accordance with the present invention.
Figure 6:
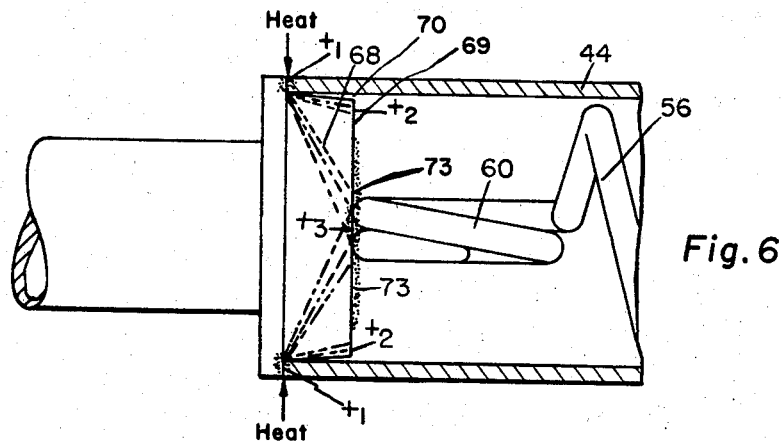
FIGURE 6 is an enlarged sectional view taken at section 6—6 of FIGURE 5.
Figure 7:
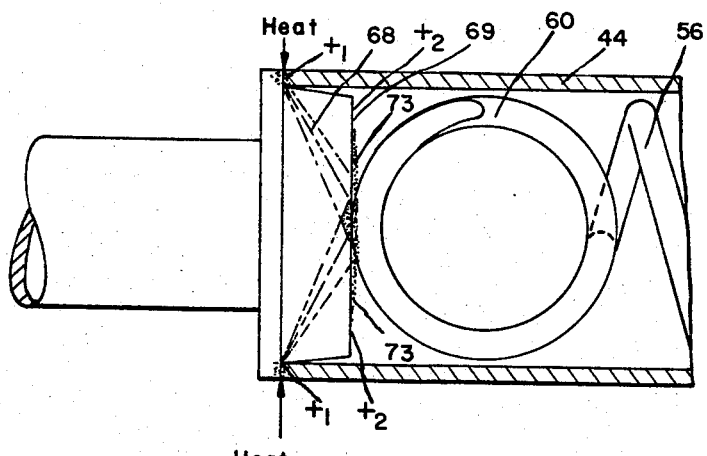
FIGURE 7 is an enlarged sectional view taken at section 7—7 of FIGURE 5.

In FIGURE 2 is illustrated the fuel element 14 of the present invention. This fuel element consists of elongated cylindrical tube 44 which is commonly referred to as the fuel element clad. This tube may be made of many different materials; however, it is preferably made of an alloy of zirconium, such as is marketed under the trade name "Zircaloy," since this material has a low neutron capture cross-section. The top end of the fuel element is closed by means of top end plug 46 and the bottom end is closed by means of bottom end plug 48, both of which are also made of Zircaloy. These end plugs are respectively welded or fused to the opposite ends of tube 44 to prevent the reactor coolant from contacting the fuel and to prevent fission product gas from escaping the fuel element. Disposed within the tube is fissionable fuel material such as uranium. The fuel illustrated in the fuel element of FIGURE 2 is in the form of pellets 50 which are placed end to end in the tube. It is to be understood, however, that the fuel may be of any type and may be in the form of powder or particles.

Fuel element 14 is also provided with a plenum chamber 54 which is provided to collect fission product gases which are given off by the nuclear fuel during operation in the nuclear reactor. The volume of this chamber is determined by the amount of fission product gases which are to be released by the fuel during its anticipated life cycle in the nuclear reactor. Plenum spring 56 is disposed in plenum chamber 54 and is provided to retain pellets 50 in facial contact with one another and typically exerts a force of about five pounds against the top end plug and the fuel pellets. This plenum spring is preferably made of Inconel-X, steel or other material having suitable spring characteristics. The spring preferably has a helical configuration with the outside diameter being less than the inside diameter of the tube. By providing only a small clearance between spring and tube, the spring may help support the adjacent plenum tube from the high pressures which may be exerted against the exterior surface of the tube by the surrounding medium within the reactor. A flat circular wafer 58 is inserted between the bottom end of spring 56 and the upper end of pellet 50' to prevent fuel particles or chips from entering the plenum chamber.

The present invention is primarily directed toward the unique association between top end plug 46, the upper end of tube 44 and end loop 60 of plenum spring 56. End plug 46 is integrally formed and includes an elongated cylindrical shank 62 having a tapered end 64 for ease of insertion into the previous described upper tie plate 18. End plug 46 also includes a cylindrical collar 66, having a diameter about equal to the diameter of tube 44, and an end section 68. End section 68 is solid, is shaped as a frustum of a cone and has a flat inner surface 69 against which the upper end of the plenum spring rests. A tapered annular volume 70 (see also FIGURES 3 through 7) is formed between the external surface of end section 68 and the internal surface of tube 44.

Figure 3:
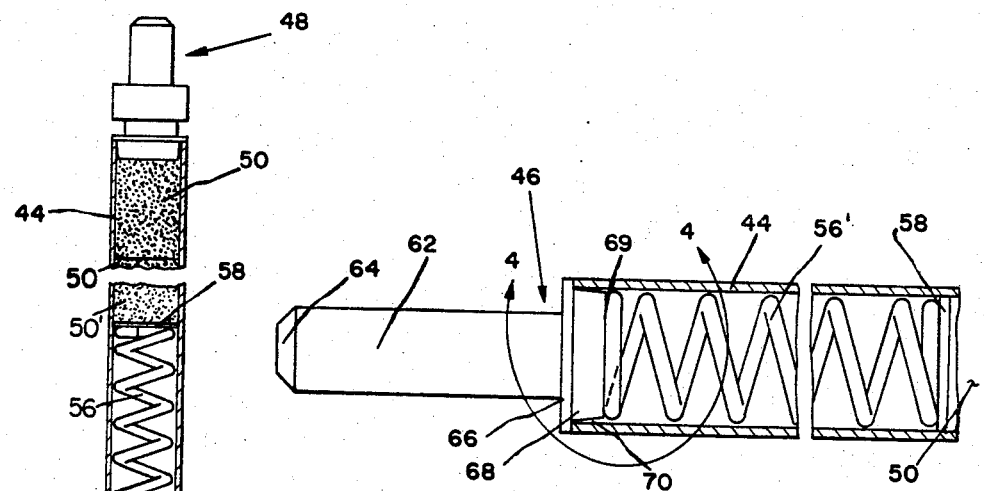
FIGURE 3 is an enlarged sectional view of the upper end of the fuel element wherein the plenum spring is of conventional configuration.
Figure 4:
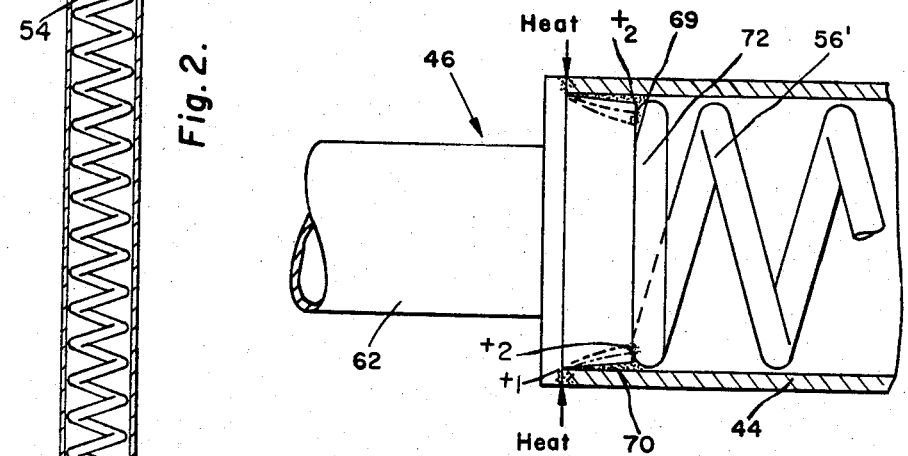
FIGURE 4 is an enlarged sectional view taken at section 4—4 of FIGURE 3.

Referring now to FIGURES 3 and 4 is shown the configuration and interrelation of a conventional plenum spring 56' as associated with top end plug 46 and tube 44 during a typical welding operation. It should be particularly noted that plenum spring 56' has its end loop in facial contact with the periphery of flat inner surface 69 of end section 68. The process that takes place when the joint between cylindrical collar 66 and the end of tube 44 are welded or fused together during typical manufacturing operations, is depicted in FIGURE 4. Heat is applied about the entire periphery of this joint as indicated by the "heat" symbols shown in FIGURE 4. As this heat is applied, the collar and tube material melt as indicated and the molten region has a temperature of $t_1$. Heat is conducted from this region along the peripheral region of the end section 68 as indicated by the dotted lines. The temperature $t_2$ of inner surface 69 that is in contact with the surface of loop 72 of spring 56' is sufficient, during typical manufacturing operations, to exceed the eutectic temperature of the materials from which loop 72 and end plug 46 are made. Therefore, the upper surface of loop 72 and the adjacent peripheral portion of inner surface 69 will melt and flow upwards within annular volume 70 and mix with the molten material which forms the weld joint. The process which the molten material flows upwards within annular volume 70 is believed to be that of capillary action since this upward flow occurs independent of gravity or the position of the fuel rod while being welded. This mixing of the iron (when the plenum spring is made of steel) or nickel (when the plenum spring is made of Inconel-X) from the plenum spring with the Zircaloy of the welded joint (both the tube and end plug being made of Zircaloy) results in the welded joint becoming brittle, less resistant to corrosion and increases the probability of failure of the fuel element during reactor operation.

It was discovered that by employing a 90° turned up end loop 60 that this undesirable condition was obviated. The reasons for this may be best understood by referring to FIGURES 5, 6 and 7. It can be seen from these figures that the top portion of end loop 60 of plenum spring 56 is in contact with the center region of flat inner surface 69 of end section 68. During welding of the joint between collar 66 and tube 44, the temperature $t_3$ at the center region of inner surface 69 is less than the temperature $t_2$ at the periphery of inner surface 69 since the heat must travel a greater distance, the heated mass is greater, and the area for heat dissipation is greater. Moreover, the temperature $t_3$ is the lowest temperature on inner surface 69 during typical welding operations. Therefore, the likelihood of melting end loop 60 of the present invention is less than that of melting end loop 72 of the conventional design.

Another important feature of the present invention is that end section 68 and end loop 60 cooperate such that even should loop 60 melt, the molten material will be generally deposited at the center portion of flat inner surface 69, as illustrated by molten material 73, and will therefore not flow into tapered annular volume 70 and contaminate the weld. Therefore, even should the end loop of the present invention melt, the probability of its contaminating the weld is less than with conventional techniques.

In order to minimize further the possibility of contaminating the weld, end loop 60 is coated with a material, such as chromium, so that the coated end loop and the end plug together have a eutectic temperature that is greater than the eutectic temperature of the uncoated spring and end plug. By coating the end loop with chromium, for example, the eutectic temperature is increased such that the end loop is even less likely to melt during the welding operation. This can be more clearly seen from the fact that the iron-Zircaloy (uncoated iron alloy spring and Zircaloy end plug) eutectic or melting temperature is about 900° C. whereas the chromium-Zircaloy (chromium coated iron alloy spring and Zircaloy end plug) eutectic or melting temperatures is about 1500° C. It can therefore be seen that the eutectic temperature has been increased by about 600° C. by coating end loop 60 wtih chromium. Since Zircaloy has a melting temperature of about 1800° C. and iron has a melting temperature of about 1500° C., the chromium-Zircaloy eutectic temperature of about 1500° C. has raised the eutectic temperature from a much lower level to the temperature level of the parent metals.

Figure 8:
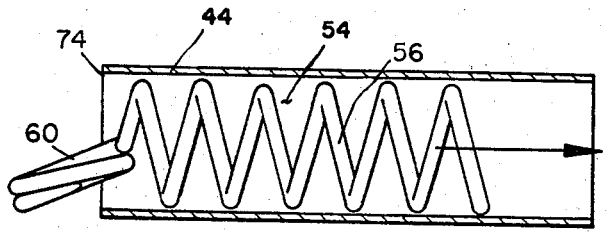
FIGURE 8 is a side view, in section showing a bent plenum spring being inserted into the plenum chamber.
Figure 9:
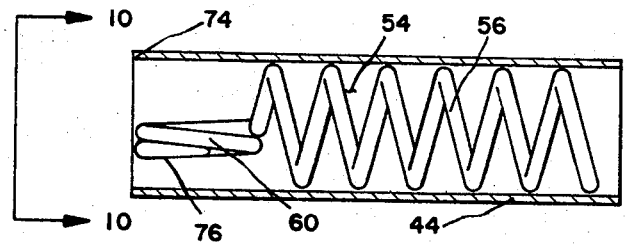
FIGURE 9 is a side view, in section, showing the bent plenum spring of FIGURE 8 fully inserted into the plenum chamber and illustrates the self-centering characteristics of the plenum spring.
Figure 10:
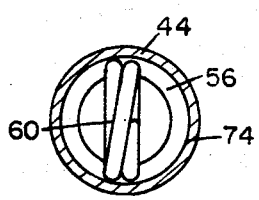
FIGURE 10 is an end view taken at section 10—10 of FIGURE 9 and also illustrates the self-centering characteristics of the plenum spring.
Figure 11:
FIGURE 11 is an alternative spring design which may be used in accordance with the teachings of the present invention.

In FIGURES 8, 9 and 10 is depicted the self-centering characteristic of end loop 60 which is a most advantageous feature for large scale manufacturing operations. As shown in FIGURE 10 (and also FIGURE 7), end loop 60 is substantially circular and has an outside diameter substantially equal to that of helical plenum spring 56 and the inside diameter of clad tube 44. In FIGURE 8 is illustrated a bent plenum spring 56 being inserted into plenum chamber 54 from left to right as indicated by the associated arrow. It will be noted that loop 60 of plenum spring 56 is bent downward which may often occur during handling of the spring. As best depicted in FIGURES 9 and 10, as the spring is moved into plenum chamber 54, loop 60 straightens out and becomes self-centered. The loop is straightened out by first sliding along inner circular edge 74 of the end of the tube 44 and then sliding along the inner surface of the tube.

We claim:

1. In a nuclear reactor fuel element which comprises a tube, first and second end plugs sealing the ends of said tube, a body of nuclear fuel disposed in one part of said tube thereby forming a plenum chamber adjacent one end of said tube, and a plenum spring extending in compression through said plenum chamber between the end of said body of fuel and the inner surface of the adjacent end plug, the improvement which comprises a coating integrally secured to the surface of said plenum spring at least in the region adjacent said end plug, said coating being of a material which forms with the material of said end plug a eutectic mixture having a melting temperature substantially higher than that of the eutectic mixture formed of the materials of said spring and said end plug.

2. A nuclear reactor fuel element according to claim 1 in which said end plug material is zirconium and said coating material is chromium.

3. A nuclear reactor fuel element according to claim 1 wherein said end plug material is an alloy of zirconium.

4. A nuclear fuel element according to claim 1 in which said plenum spring is helical and has an outside diameter relative to the inside diameter of said tube providing only a small clearance therebetween thereby supporting said tube in the region of said plenum chamber against exterior applied pressures.

5. A nuclear reactor fuel element according to claim 1 in combination with a flat wafer disposed between one end of said plenum spring and the adjacent body of said fuel material.

6. A nuclear reactor fuel element according to claim 1 wherein said plenum spring is adapted to contact said inner surface of said end plug only at a point substantially at the center of said surface.

7. A nuclear reactor fuel element according to claim 6 wherein the end of said spring adjacent said end plug is provided with a substantially circular loop disposed substantially 90° with respect to the turns of said plenum spring.

8. A nuclear reactor fuel element according to claim 7 wherein said loop consists of a half turn.

9. A nuclear reactor fuel element according to claim 7 wherein said loop consists of substantially a full turn.

10. A nuclear reactor fuel element according to claim 7 in which the outside diameter of said loop is substantially equal to the outside diameter of said plenum spring and to the inside diameter of said tube.

11. A nuclear reactor fuel element according to claim 1 wherein the end of said plenum spring adjacent said end plug is provided with a plurality of turns of decreasing diameter, the end of which spring contacts the interior surface of the adjacent end plug substantially at the center of said surface.

References Cited
UNITED STATES PATENTS

| | | | |
|---|---|---|---|
| 2,983,663 | 5/1961 | Bassett | 176—68 |
| 2,984,613 | 5/1961 | Bassett | 176—68 |
| 3,009,869 | 11/1961 | Bassett | 176—68 |
| 3,022,240 | 2/1962 | Bassett | 176—68 |
| 3,274,067 | 9/1966 | Greebler et al. | 176—73 X |
| 3,275,525 | 9/1966 | Bloomster et al. | 176—73 |

L. DEWAYNE RUTLEDGE, *Primary Examiner.*

CARL D. QUARFORTH, *Examiner.*

M. J. SCOLNICK, *Assistant Examiner.*